US008316732B2

(12) United States Patent
Wu et al.

(10) Patent No.: US 8,316,732 B2
(45) Date of Patent: Nov. 27, 2012

(54) ROLLER SCREW STRUCTURE

(75) Inventors: Wen-Chia Wu, Taichung (TW); Yan-Yu Chen, Taichung (TW)

(73) Assignee: Hiwin Technologies Corp., Taichung (TW)

( * ) Notice: Subject to any disclaimer, the term of this patent is extended or adjusted under 35 U.S.C. 154(b) by 268 days.

(21) Appl. No.: 12/726,110

(22) Filed: Mar. 17, 2010

(65) Prior Publication Data
US 2010/0180706 A1    Jul. 22, 2010

Related U.S. Application Data

(63) Continuation-in-part of application No. 11/777,983, filed on Jul. 13, 2007.

(51) Int. Cl.
*F16H 25/22* (2006.01)

(52) U.S. Cl. .................. 74/424.82; 74/424.88

(58) Field of Classification Search ............... 74/424.88, 74/424.91–424.93
See application file for complete search history.

(56) References Cited

U.S. PATENT DOCUMENTS
2009/0013812 A1*  1/2009  Wu et al. ............... 74/424.91
* cited by examiner

*Primary Examiner* — William C Joyce
*Assistant Examiner* — Terence Boes

(57) ABSTRACT

A roller screw structure comprises a nut, a screw and a rolling assembly. The rolling assembly is movably disposed between the nut and the screw and includes at least one rolling cone. The slantwise rolling surface of the rolling cone contacts the spiral groove surfaces of the nut and the screw in a line-to-line manner, and the angle between the rolling surface and the self-rotation axis of the rolling cone is from 0 degree to 6.3 degrees. Thereby, making the distance between the self-rotation axis and the rolling surface of the rolling cone of the rolling assembly different can prevent the occurrence of speed difference caused at different rolling paths of the rolling assembly.

1 Claim, 6 Drawing Sheets

ROLLER SCREW STRUCTURE

This application is a continuation of part of U.S. patent application Ser. No. 11/777,983, which claims the benefit of the earlier filing date of Jul. 13, 2007. Claim 1 of this application is revised from the combination of claims 1 and 2 of U.S. patent application Ser. No. 11/777,983.

BACKGROUND OF THE INVENTION

1. Field of the Invention

The present invention relates to a roller screw structure, and more particularly to a roller screw structure which uses the rolling cone as the rolling assembly.

2. Description of the Prior Art

Conventionally, a roller screw structure 10 (as shown in FIG. 1) comprises a nut 11, a screw 12 and a rolling assembly 13. The rolling assembly 13 includes at the least one constant cross-section roller 131, and the roller 131 rolls between the screw 12 and the nut 11 and moves along the track defined by the nut 11 and the screw 12 in a line-line contact manner. Due to the uniform speed of the self-rotation axes of the roller 131, it will cause the roller to produce different rolling paths at different positions when it is in line-to-line contact with the track. For example, the rolling path of the outer edge of the roller is comparatively long, while the rolling path of the inner edge of the roller is comparatively short. Within the same time period, the different rolling paths of the roller 131 will produce the so-called Speed Difference, and the further rolling action of the roller will cause the idle motion, thus increasing the friction of the partial rolling surface of the roller 131, and accelerating the abrasion of the roller 131 to reduce the service life. Moreover, if the worn roller is not replaced, it will influence the smooth linear movement of the screw 12 and the nut 11.

As shown in FIGS. 2-4, another conventional roller screw uses tapered rollers 30 where the apex of the cones is located on the centerlines of the screw 32 so that the tapered rollers 30 roll without a relative speed difference with respect to their respective rolling surface to prevent slipping, and this conventional roller screw satisfies the relationship:

$$\tan\gamma = \frac{\sqrt{2}\, r_0}{d_m}$$

wherein $\gamma$ is an angle of the self-rotation axis of the roller with respect to the rolling surface of the roller, $d_m$ is a pitch circle diameter, $r_0$ is the center rotation radius of roller 30, a lead angle between the screw 32 and the nut 31 is $\beta$, and $\alpha$ is an contact angle of the self-rotation axis of the roller with respect to the axis of the screw. This conventional roller screw satisfies the following relations:

$d_m = 40$ $r_0 = 4$ lead=12

$\beta = 5.45$ $\alpha = 80$

This conventional roller screw has the following disadvantages:

First, the contact angle is too large so that the roller is unable to bear axial load, which means that this conventional roller screw is incapable of withstanding the vibration caused by screw rotation.

Second, the contact angle is nearly 90 degrees, making it difficult to design the threads 320 of the screw 32, as shown in FIG. 2. The gap between two neighboring threads 320 of the screw 32 must be large enough to maintain the structural rigidity, therefore, the lead of this conventional roller screw has to be very large (nearly two times of the lead of the present invention) and can't adopt the double-thread design.

Third, the contact angle is nearly 90 degrees, so the inner diameter of the nut 31 has to be smaller than the outer diameter of the screw 32, and accordingly the width of the thread 320 of the screw 32 is relatively large, making it complicated and difficult to assemble and manufacture.

The present invention has arisen to mitigate and/or obviate the afore-described disadvantages.

SUMMARY OF THE INVENTION

The primary objective of the present invention is to provide a roller screw structure which utilizes the difference of the distance between the rolling surface and the self-rotation axis of the rolling cone to prevent the occurrence of speed difference caused at different rolling paths of the rolling assembly.

In order to achieve the abovementioned objective, the roller screw structure of the present invention comprises a nut, a screw and a rolling assembly. The screw and the nut include two correspondingly located spiral grooves, the circulating assembly is disposed on the nut and includes a return path that defines a closed circulating path by cooperating with the spiral groove of the nut, and the rolling assembly is movably disposed in the spiral groove and the circulating path and includes at least one rolling cone which is a truncated cone. The slantwise rolling surface of the rolling cone is in a line-to-line contact with the surfaces of the spiral grooves of the nut and the screw, and an angle between the self-rotation axis and the rolling surface of each rolling assembly is from 0 degree to 6.3 degrees. The lead angle between the screw and the nut is $\beta$, a pitch circle diameter is dm, the center rotation radius of rolling cone is $r_0$, the size range of the roller screw structure is made between:

$$0 < \frac{\sqrt{2}\, r_0}{d_m}\cos\beta^2 < 0.11$$

An inner diameter of the nut is larger than an outer diameter of the screw.

Making the distance between the self-rotation axis and the rolling surface of the rolling cone of the rolling assembly different can prevent the occurrence of speed difference caused at different rolling paths of the rolling assembly.

It is to be noted that the equation of this conventional roller screw in which the apex of the cones are not located on the centerlines of the screw shaft is that $$\tan\gamma = \frac{\sqrt{2}\, r_0}{d_m},$$

while the equation of the present invention is $$\tan\gamma = \frac{\sqrt{2}\, r_0}{d_m}\cos\beta^2,$$

therefore, the apex of the cones of the present invention are not located on the centerlines of the screw shaft.

DETAILED DESCRIPTION OF THE PREFERRED EMBODIMENTS

The present invention will be the clearer from the following description when viewed together with the accompanying drawings, which show, for purpose of illustrations only, the preferred embodiment in accordance with the present invention.

Figure 1:
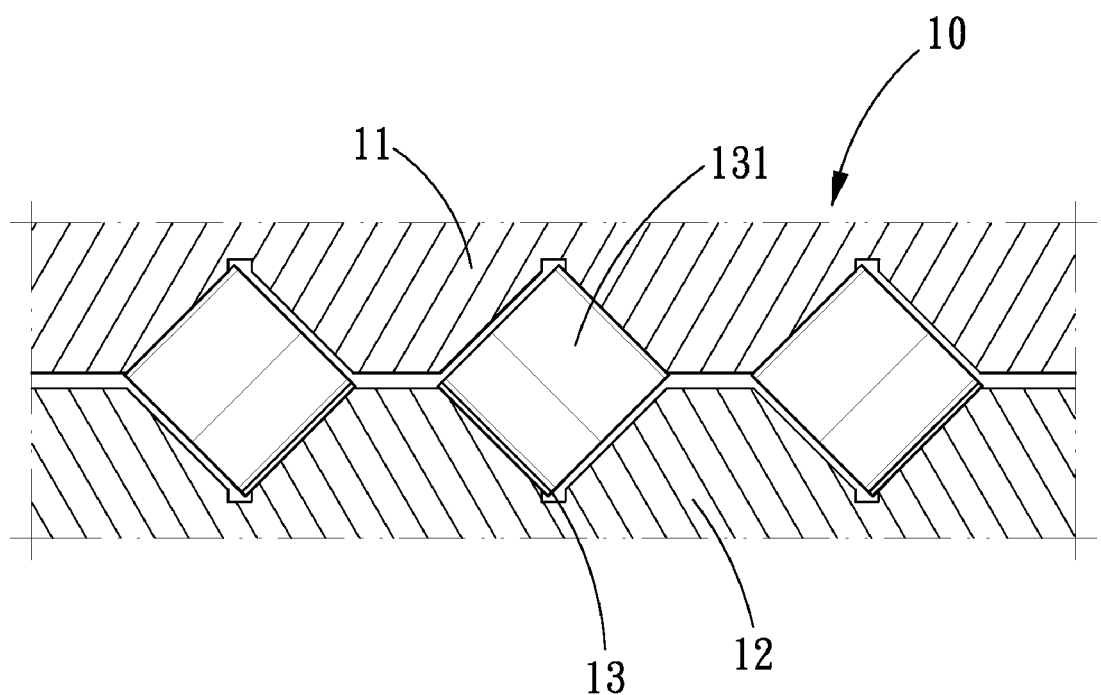
FIG. 1 is a plane view of a conventional roller screw structure.
Figure 2:
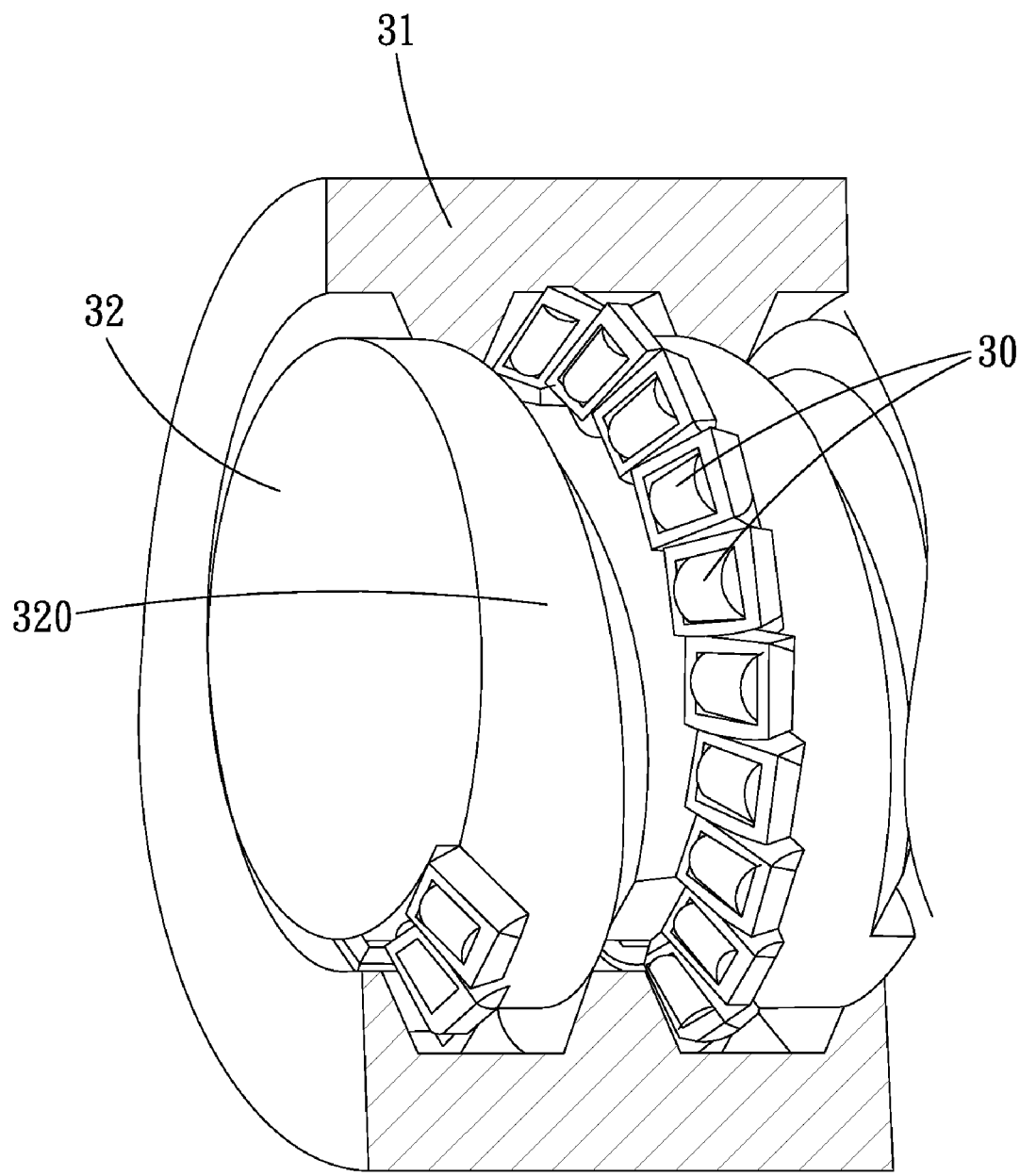
FIG. 2 shows a roller of another conventional roller screw.
Figure 3:
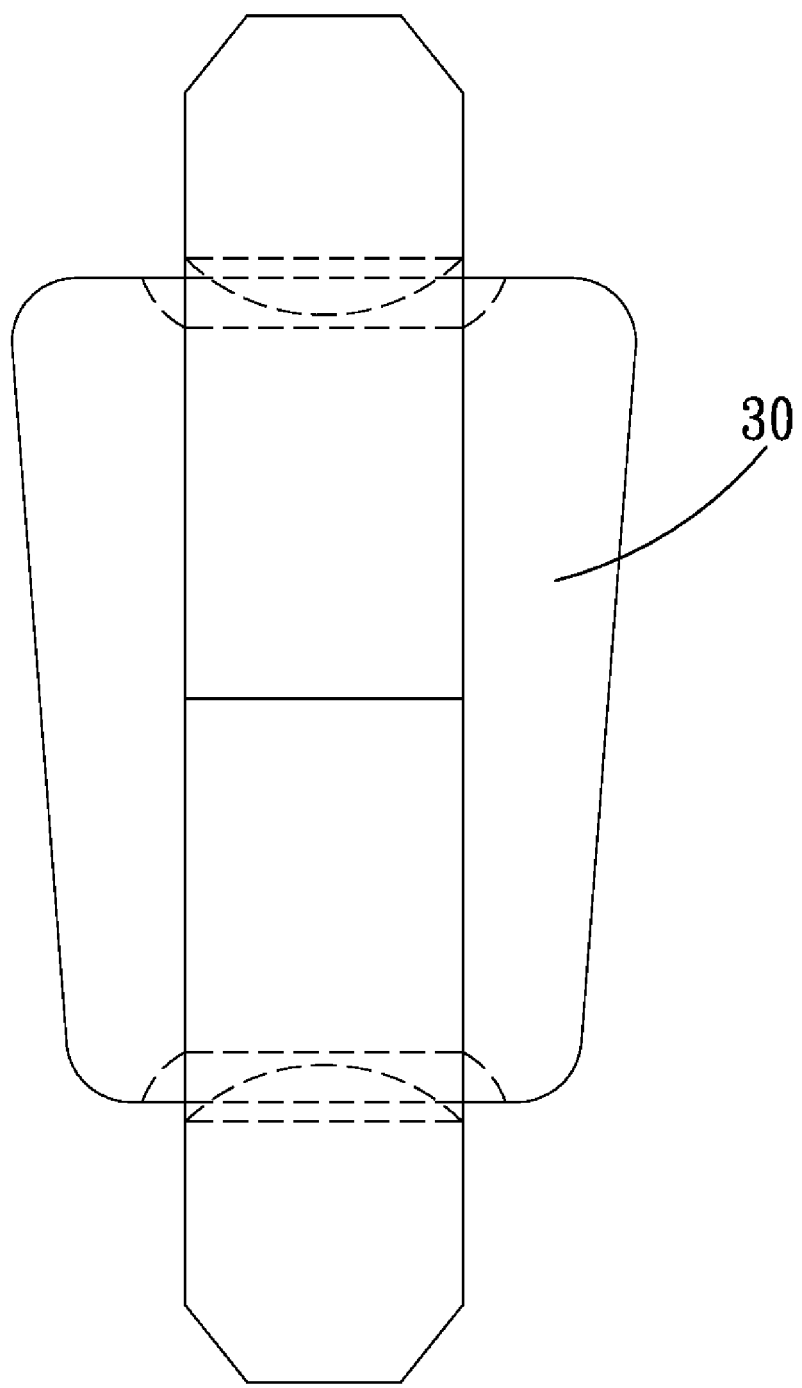
FIG. 3 is a perspective view of the another conventional roller screw.
Figure 4:
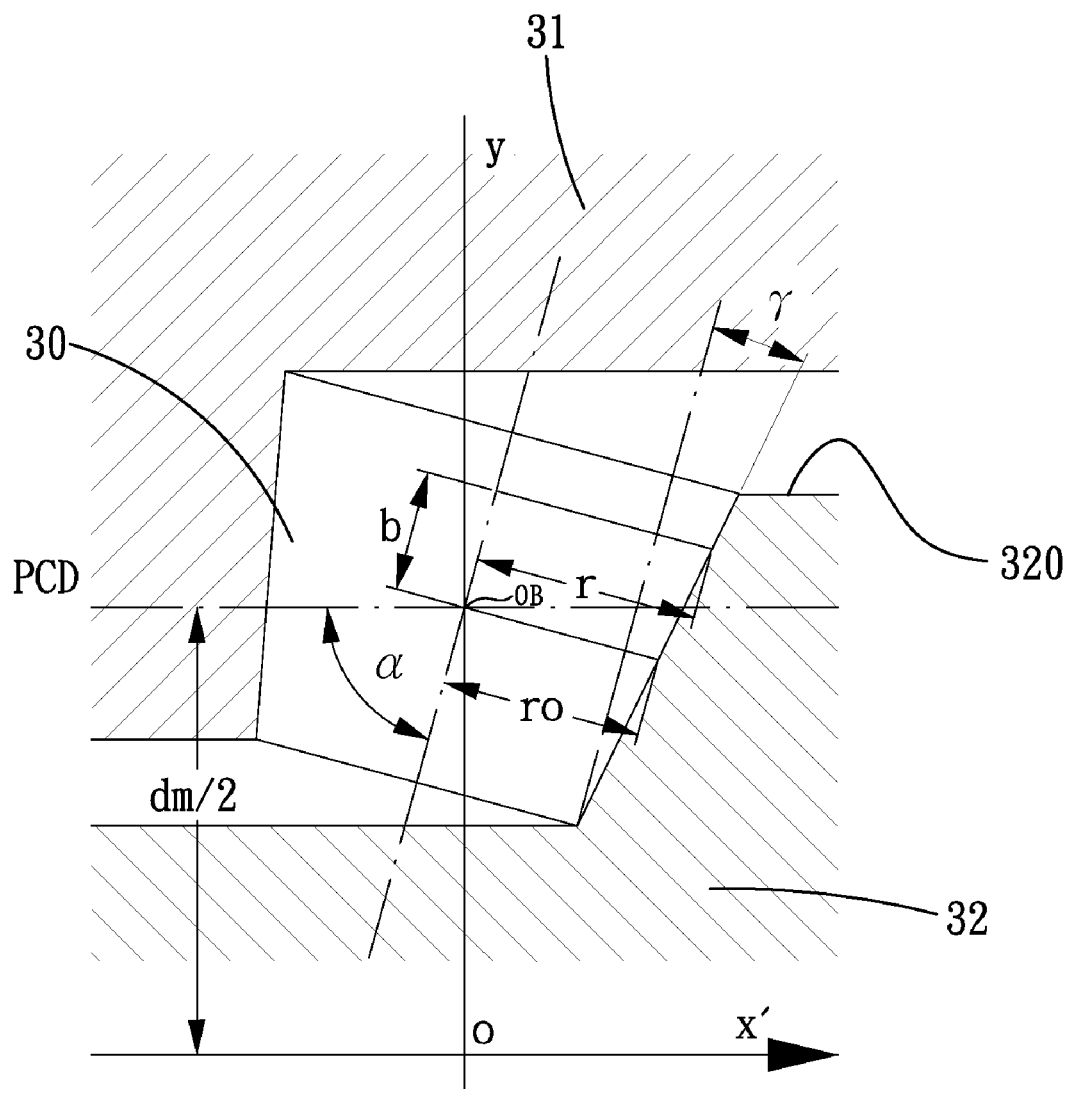
FIG. 4 is a cross sectional view of another conventional roller screw structure.
Figure 5:
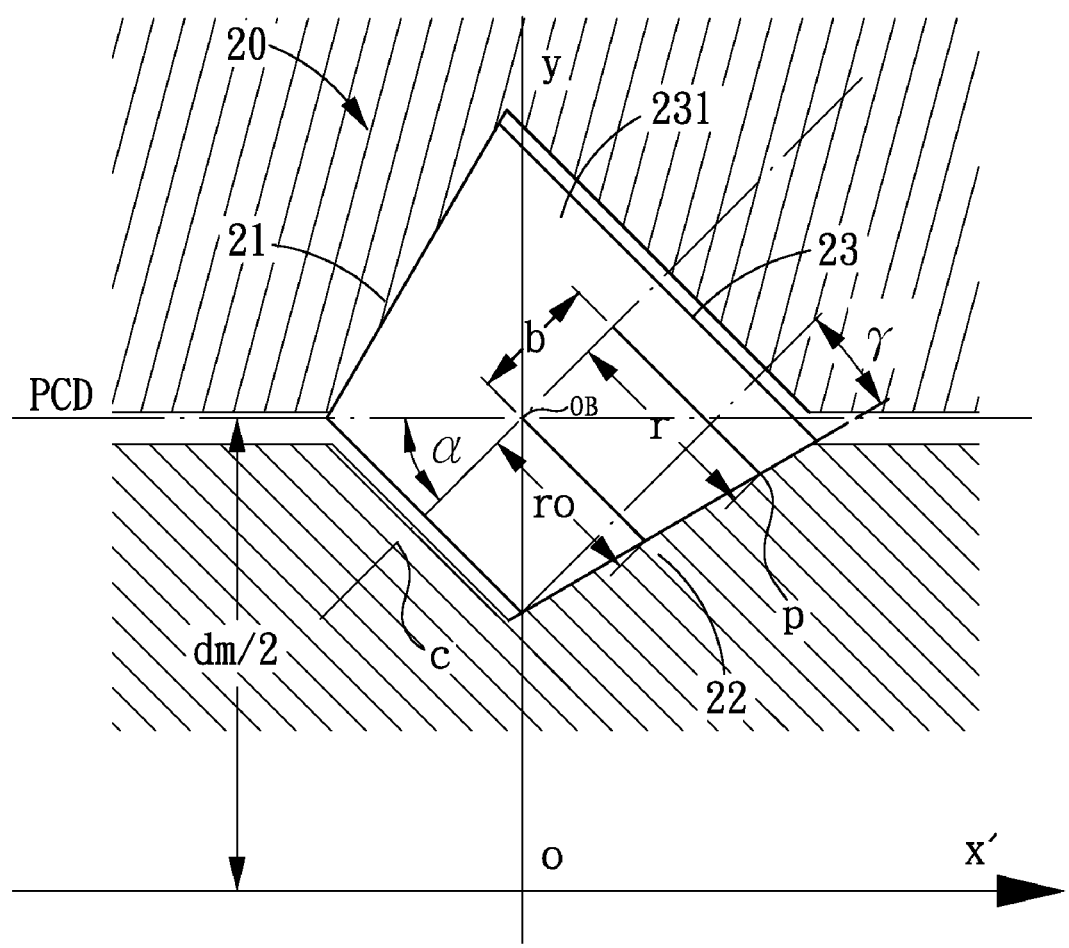
FIG. 5 is a plane view of a roller screw structure in accordance with the prevent invention.
Figure 6:
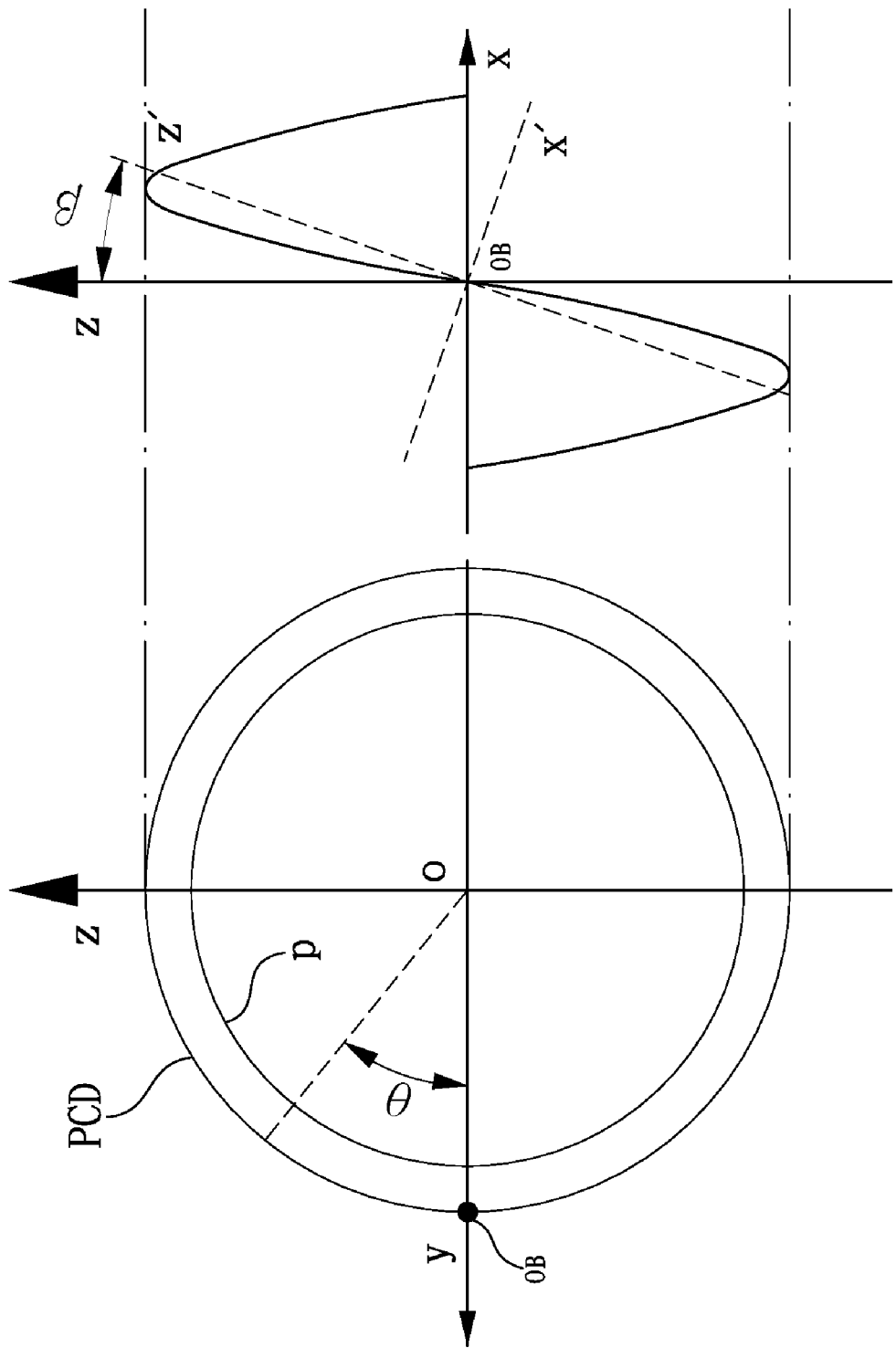
FIG. 6 is a front view of the roller screw structure in accordance with the prevent invention.

Referring to FIGS. 2 and 3, a roller screw structure 20 in accordance with a preferred embodiment of the present invention comprises a nut 21, a screw 22 and a rolling assembly 23. The nut 21 and the screw 22 have two correspondingly located spiral grooves. A circulating assembly is installed on the nut 21 and includes a return path that defines a closed circulating route by cooperating with the spiral groove of the nut. The rolling assembly 23 is movably disposed in the spiral groove and the circulating path and includes at least one rolling cone 231, which is a truncated cone. The slantwise rolling surface of the rolling cone 231 is in line-to-line contact with the surfaces of the spiral grooves of the screw 22 and the nut 21. The angle between the self-rotation axis and the rolling surface of the rolling cone 23 is from 0 degree to 6.3 degrees. The lead angle between the screw 22 and the nut 21 is $\beta$, the pitch circle diameter is dm, and the central rotation radius of the rolling cone is $r_0$, they satisfy the following relationship:

$$0 < \frac{\sqrt{2}\,r_0}{d_m}\cos\beta^2 < 0.11$$

In order to prevent the occurrence of speed difference caused at different rolling paths of the rolling assembly 23, it must reply on the difference of the distance between the rolling surfaces of the rolling cone 231 of the rolling assembly 23 and the self-rotation axis c. As to the relationships of the angle $\gamma$ of the rolling surfaces of the rolling cone 231 of the rolling assembly 23 and its self-rotation axis c, the contact angle $\alpha$ which is an angle between the self-rotation axis c of the rolling once 231 and the axis of the screw, the pitch circle diameter (PCD) and the lead angle $\beta$, they can be deduced as follows:

First, finding out the relationship between the rotation radius $r_0$ of the center $O_B$ of the PCD of the rolling cone 231, the contact point p of the screw 22 and the rotation radius r of the contact point p:

$$b \tan\gamma = r - r_0$$

B represents the distance between the contact point p and the rotation center $O_B$, and the coordinates of the contact point p on the x'-y plane are:

$$S = r_0 \sin\alpha + b\cos(\alpha-\gamma)/\cos\gamma$$

$$R = d_m/2 - r_0\cos\alpha + b\sin(\alpha-\gamma)/\cos\gamma$$

Transferring the coordinates of the contact point p on the x'-y plane onto the three-dimensional coordinate axis x-y-z (as shown in FIG. 2), the coordinates $(x_0, y_0, z_0)$ are:

$$x_0 = S\cos\beta$$

$$y_0 = R$$

$$z_0 = -S\sin\beta$$

If the screw 22 is rotated at the angle of $\theta$, the coordinates of the contact point p on the x-y-z coordinate axis are changed into $(x(\theta), y(\theta), z(\theta))$:

$$X(\theta) = S\cos\beta + h\theta$$

$$y(\theta) = R\cos\theta + S\sin\beta\sin\theta$$

$$z(\theta) = R\sin\theta - S\sin\beta\cos\theta$$

H is equal to $\tan\beta \times dm/2$, partially differentiating $x(\theta)$, $y(\theta), z(\theta)$ against the angle $\theta$, then inputting the angle $\theta=0$, thus obtaining the rotation unit angle of screw 22 when the angle $\theta$ is equal to 0, the displacement of the contact point p $((\Delta x(\theta), \Delta y(\theta), \Delta z(\theta))$:

$$\Delta X(\theta) = h$$

$$\Delta y(\theta) = S\sin\beta$$

$$\Delta z(\theta) = R$$

At last, projecting $\Delta x(\theta), \Delta y(\theta), \Delta z(\theta)$ in the direction of z' to obtain the displacement $\Delta p(b)$ of the rotation unit angle point p of the screw 22 in the direction of the lead:

$$\begin{aligned}\Delta p(b) &= R\cos\beta + h\sin\beta \\ &= \frac{\cos\beta d_m}{2} - \cos\beta r_0\cos\alpha + \frac{\cos\beta b\sin(\alpha-\gamma)}{\cos\gamma} + \frac{d_m\sin^2\beta}{2\cos\beta} \\ &= \frac{d_m}{2\cos\beta} - \cos\beta r_0\cos\alpha + \frac{\cos\beta b\sin(\alpha-\gamma)}{\cos\gamma}\end{aligned}$$

In order to prevent the occurrence of the speed difference caused at the different rolling paths of the rolling assembly 23, the ratio of the rotation radius $r_0$ of the $O_B$ to the rotation radius r of the contact point p must be equal to the ratio of $\Delta p(0)$ to $\Delta p(b)$ or it can be expressed as follows:

$$\frac{r-r_0}{r_0} = \frac{b\tan\gamma}{r_0} = \frac{\Delta p(b)-\Delta p(0)}{\Delta p(0)} = \frac{\dfrac{\cos\beta b\sin(\alpha-\gamma)}{\cos\gamma}}{\dfrac{d_m}{2\cos\beta}-\cos\beta r_0\cos\alpha}$$

The last obtained relation 1 is the relationship between the size of the rolling cone 231 of the rolling assembly 23 and the screw 22:

$$d_m\tan\gamma = 2r_0\sin\alpha\cos\beta^2 \qquad 1$$

For the same reason, if the contact point p is on the nut 21, it can also deduce a relation 2:

$$d_m\tan\gamma = 2r_0\cos\alpha\cos\beta^2 \qquad 2$$

The relation 1 is different from the relation 2, but the size of the rolling cone 231 of the rolling element 23 must be the same, so the relation 3 must be satisfied:

$$\Rightarrow \cos\alpha = \sin\alpha \qquad 3$$

$$\Rightarrow \alpha = 45°$$

Obtained from the incorporation of the abovementioned two relations:

$$\tan\gamma = \frac{\sqrt{2}\,r_0}{d_m}\cos\beta^2$$

An inner diameter of the nut 21 is larger than an outer diameter of the screw 22.

Because the angle γ of the rolling cone 231 of the rolling element 23 will cause the contact angle between the rolling cone 231 and the screw 22 to be (45−γ) degrees and the contact angle between the rolling cone 231 and the nut 21 to be (45+γ) degrees, the ratio of the bearable axial load of the screw 22 to the nut 21 is:

$$\frac{\sin(45-\gamma)}{\sin(45+\gamma)}$$

Setting the ratio larger than 0.8, so as to avoid of the great service life fall between the screw 22 and the nut 21, then obtaining the range of γ (the service life of the roller screw 20 is the minimum service life of the screw 22 and the nut 21, so if γ=0, namely, the contact angle between the screw 22 and the nut 21 is optimally 45 degrees, but the problem of speed difference still exists, hence, the load ratio is set larger than 0.8 based on considering the service life):

$$1 > \frac{\sin(45-\gamma)}{\sin(45+\gamma)} > 0.8 \Rightarrow 0 \le \gamma \le 6.3°$$

Further, in consideration of the actual mass production status, the lead angle β between the screw 22 and the nut 21, the pitch circle diameter dm, and the centre rotation radius $r_0$ of the rolling cone 231 have a lot of change, hence it is difficult to set the differential speed at 0, so the size range of the screw structure 20 is set within the angle range of the rolling cone 231:

$$0 < \frac{\sqrt{2}\,r_0}{d_m}\cos\beta^2 < 0.11$$

The aforementioned is the summary of the positional and structural relationship of the respective components of the preferred embodiment in accordance with the present invention.

For a better understanding of the present invention, its operation and function, reference should be made to FIGS. 2-3:

The slantwise rolling surface of the rolling cone 231 of the rolling assembly 23 contacts the surfaces of the spiral grooves of the screw 22 and the nut 21 in a line-to-line manner, the angle between the self-rotation of the rolling cone 23 and the rolling surface of the nut 21 is from 0 degree to 6.3 degrees, the lead angle between the screw 22 and the nut 21 is β, the pitch circle diameter is dm, and the centre rotation radius of the rolling cone 231 is $r_0$, the size range of the screw structure is made between:

$$0 < \frac{\sqrt{2}\,r_0}{d_m}\cos\beta^2 < 0.11;$$

By such arrangements, the distance between the rolling surface and the self-rotation axis of the rolling cone 231 of the rolling assembly 23 is made different, so as to prevent the occurrence of the speed difference caused at the different rolling paths of the rolling assembly 23.

To summarize, a roller screw structure of the present invention comprises a nut, a screw and a rolling assembly. The rolling assembly is movably installed between the nut and the screw and includes at least one rolling cone. The slantwise rolling surface of the rolling cone contacts the surface of the spiral groove in a line-to-line manner, the angle between the self-rotation axis and the rolling surface of the rolling cone is from 0 degree to 6.3 degrees. Thereby, making the distance between the self-rotation axis and the rolling surface of the rolling cone of the rolling assembly different can prevent the occurrence of speed difference caused at different rolling paths of the rolling assembly.

While we have shown and described various embodiments in accordance with the present invention, it is clear to those skilled in the art that further embodiments may be made without departing from the scope of the present invention.

What is claimed is:

1. A roller screw structure comprising a screw, a nut, a circulating assembly and a rolling assembly; wherein the screw and the nut include two correspondingly located spiral grooves, the circulating assembly is disposed on the nut and includes a return path that defines a closed circulating route by cooperating with the spiral groove of the nut, and the rolling assembly is movably disposed in the spiral grooves and the return path, the roller screw structure is characterized in that:

the rolling assembly is a truncated cone, a slantwise rolling surface thereof contacts a surface of the spiral groove of the nut in a line-to-line manner, and an angle between a self-rotation axis and the rolling surface of the rolling assembly is from 0 degree to 6.3 degrees;

a lead angle between the screw and the nut is β, a pitch circle diameter is dm, a center rotation radius of each rolling assembly is $r_0$, a contact angle α between the self-rotation axis and an axis of the screw is 45 degrees, an inner diameter of the nut is larger than an outer diameter of the screw, a size range of the roller screw structure is made between:

$$0 < \frac{\sqrt{2}\,r_0}{d_m}\cos\beta^2 < 0.11.$$

* * * * *